Aug. 9, 1949.　　　　W. A. HASBANY　　　　2,478,868
TRANSMISSION

Filed June 21, 1946　　　　　　　　　　3 Sheets-Sheet 1

INVENTOR.
BY Woodrow A. Hasbany
Brown, Jackson, Boettcher & Dienner
ATTORNEYS.

Patented Aug. 9, 1949

2,478,868

UNITED STATES PATENT OFFICE 2,478,868

TRANSMISSION

Woodrow A. Hasbany, South Bend, Ind., assignor to The Studebaker Corporation, South Bend, Ind., a corporation of Delaware Application June 21, 1946, Serial No. 678,449

7 Claims. (Cl. 74—763)

My present invention relates to an improvement in transmissions, and more particularly to transmissions of the planetary or epicyclic gear type providing a plurality of gear ratios for forward drive and reverse drive.

Planetary gear mechanisms have come into use in constructing automatic or semi-automatic transmissions for automotive vehicles largely because of the ease with which they may be controlled to effect changes in gear ratio. These automatic or semiautomatic transmissions usually comprise a fluid torque convertor unit which, as is known, provide infinitely variable torque multiplication automatically, and which when used in conjunction with a planetary gear mechanism provides a form of transmission particularly adaptable for use in obtaining desired forward gear ratios for an automotive vehicle. In such types of transmissions it has been proposed to provide a second planetary or epicyclic gear mechanism which is adapted to be actuated to provide for reverse drive. For example, a pair of planetary gear mechanisms may be arranged so that one of the planetary gear mechanisms provides either ratio or direct forward drive therethrough, when the second of the planetary gear mechanisms is locked-up, and which latter planetary gear mechanism when one of the elements thereof is caused to be held against rotation, is adapted to effect a reverse drive.

In the co-pending application of Harold E. Churchill, Paul V. Haigh and Harold O. Zander, Serial No. 644,828, filed February 1, 1946, there is disclosed a transmission of a type last referred to. In the transmission of that application a planetary gear mechanism is provided for effecting reverse drive which has associated therewith positive jaw clutch and brake means for clutching two of the elements together for conjoint rotation for forward drive and for braking of one of the elements of the mechanism to effect reverse drive. However, it is found that the selective actuation of a planetary gear mechanism as by positive jaw clutch and brake means to effect forward or reverse drive therethrough is not entirely satisfactory in that it is difficult to engage and disengage the positive jaw clutch and brake teeth as smoothly as is desired in the operation of an automotive vehicle.

It is an object of my present invention to provide a transmission comprising a plurality of planetary gear mechanisms having a common member forming an element of each thereof and arranged with respect to each other so that one of the planetary gear mechanisms is adapted to be controlled to provide selected forward drive ratios with another of the planetary gear mechanisms being adapted to be controlled to effect reverse drive.

A further object of my invention is to provide an arrangement of a pair of planetary gear mechanisms each comprising three elements, namely, a sun gear, planet pinion means, and a ring gear, in which a common member forms one of the elements of each of the planetary gear mechanisms and with suitable brake and clutch means being associated with the planetary gear mechanisms operable for effecting selected forward drive ratios therethrough and for effecting reverse drive.

A still further object is to provide a transmission as aforesaid having drive and driven shafts in which the pair of planetary gear mechanisms each have one of the elements thereof formed as a common integral member extending therebetween with a pair of the elements of one planetary gear mechanism having connection one each with the drive and driven shafts, and in which brake and clutch means are arranged with respect to certain of the elements of the planetary gear mechanisms to provide a plurality of forward drive ratios to the driven shaft and a reverse drive to the driven shaft.

I propose to achieve the aforesaid objects by providing a transmission comprising a first planetary gear mechanism having a first sun gear, first planet pinion means, and a first ring gear, and a second planetary gear mechanism comprising a second sun gear, second planet pinion means and a second ring gear. In the preferred embodiment of my invention herein disclosed the drive shaft for the transmission has driving connection with the first ring gear and the driven shaft has driving connection with the planet arm or carrier of the first planet pinion means. The arrangement further is such that the first ring gear is formed integrally with the second sun gear. In such a relationship of parts I propose to provide a first brake means selectively operable for holding the first sun gear against rotation for effecting low ratio drive through the first planetary gear mechanisms and which when the first brake means is applied the second planetary gear mechanism idly rotates without transmitting any torque.

The transmission further embodies a clutch means preferably of the disc type between two of the elements of the first planetary gear mechanism so that when this clutch is actuated with the first brake means referred to being released direct drive in the forward direction is adapted to be transmitted through the first planetary gear mechanism from the drive to the driven shaft of the transmission. The transmission further comprises a second brake means associated with the planet arm of the second planet pinion means of the second planetary gear mechanism, which second brake means is selectively operable for holding the second planet pinion means against rotation and which when the second brake means is caused to be actuated with the first brake means and the clutch means disengaged effects reverse drive through the planet pinion means of the first planetary gear mechanism to the driven shaft of the transmission.

A preferred feature of one embodiment of a transmission constructed in accordance with my present invention resides in the provision of an arrangement wherein the first and second planetary gear mechanisms are spaced lengthwise of each other and co-axially of a common axis of the drive and driven shaft of the transmission.

A preferred feature of another embodiment of my invention is an arrangement wherein the first and second planetary gear mechanisms are disposed co-axially of a common axis of the drive and driven shafts, and further wherein the planetary gear mechanisms are disposed concentrically of each other.

When, as in the embodiment first referred to, the planetary gear mechanisms are spaced lengthwise of each other axially of the shafts a transmission of low height is provided. Where minimum axial length is desired and height is not objectionable the second embodiment of the transmission is of utility.

The above and other objects and advantages of my invention will appear from the detail description.

Now in order to acquaint those skilled in the art with the manner of constructing and utilizing transmissions in accordance with my present invention, I shall describe in connection with the accompanying drawings certain preferred embodiments of my invention.

Figures 1, 6:
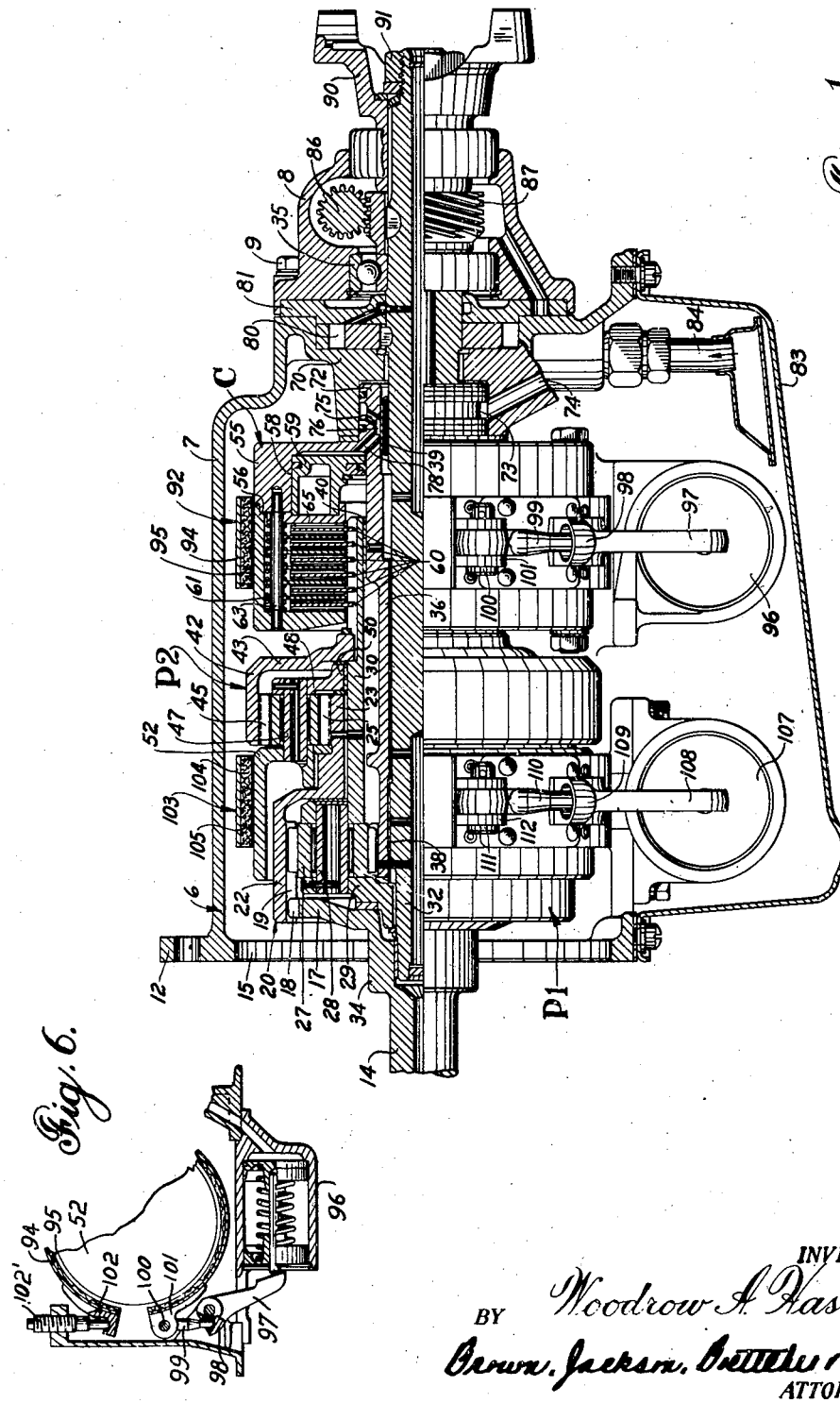
Figure 1 is a detail vertical sectional view of a transmission constructed in accordance with my invention, with certain of the parts of the transmission being shown in elevation.
Figure 4:
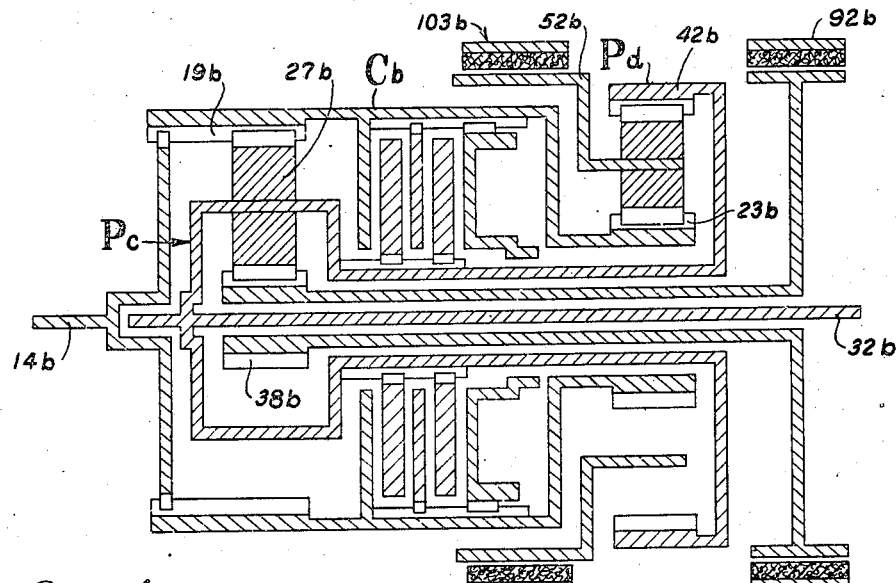
Figure 4 is a diagrammatic view of another embodiment of a transmission constructed in accordance with my present invention.
Figure 5:
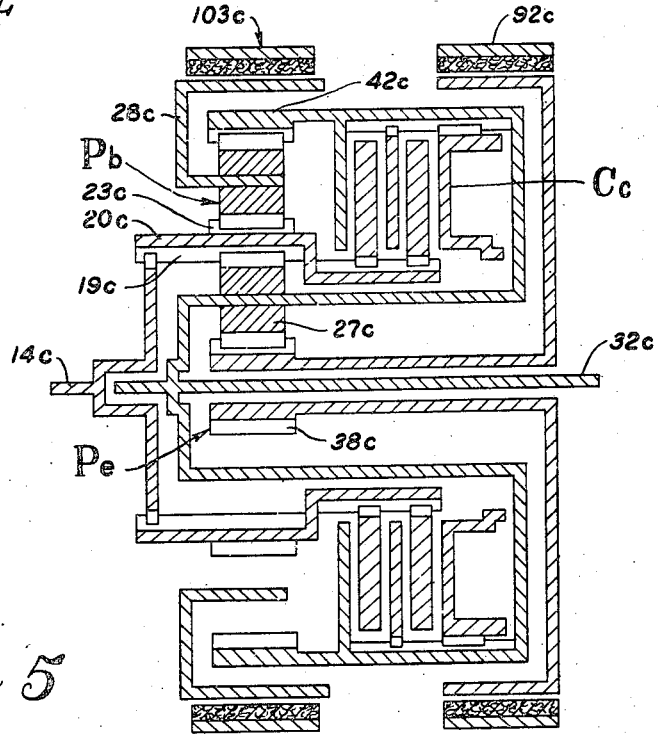

Figure 5 is a diagrammatic view of a transmission along the lines of the transmission of Figure 4, but showing an arrangement wherein the first and second planetary gear mechanisms are disposed concentrically of each other about the common axis of drive and driven shafts of the transmission; and Figure 6 is a partial detail vertical sectional view showing a suitable form of mechanism for actuating the brake means of the transmission of my invention.

Referring now to Figure 1 I have shown a transmission 6 comprising a transmission housing section 7 and a speedometer housing section 8 is which the latter is secured to the outer end of the housing section 7 by a plurality of bolts one of which is shown at 9. The inner end of the housing section 7 is provided with a radially outwardly extending flange 12 adapted to be bolted to the housing of a fluid torque converting unit (not shown) in a manner well known in the art. A drive shaft 14 extends inwardly of the inner end of the housing section 7 through the opening 15 and the drive shaft 14 may, for example, have connection with the rotor or driven element of a conventional fluid torque converting unit which unit as is known is adapted to have the impeller or turbine element thereof connected with the crank shaft of a prime mover such as an internal combustion engine and through which the drive shaft 14 is caused to be driven by the prime mover. The drive shaft 14 as shown is provided with an annular flange 17 at its inner end and which about its periphery is provided with a plurality of teeth 18 having driving connection with the ring gear teeth 19 of a sleeve member 20 having a first sleeve portion 22 and a second sleeve portion 23 with the sleeve portion 22 being of greater diameter than the sleeve portion 23. The ring gear teeth 19 are formed internally of sleeve portion 22 which forms the ring gear element of a first planetary gear mechanism P1. The sleeve portion 23 of the member 20 is provided with external sun gear teeth 25 and serves as the sun gear element of a second planetary gear mechanism P2.

The first planetary gear mechanism P1 comprises a plurality of single planet pinions 27 (only one of which is shown in the drawing) each of which is rotatively mounted upon a pin 28 secured at its opposite end in an annular end plate member 29 forming one part of a planet arm or carrier means for the planet pinions, and at the other end in a radially extending flange of a hollow planet arm shaft 30 extending co-axially of the axis of the drive shaft 14 and forming another part of the planet carrier. A driven shaft 32 is disposed co-axially of the drive shaft 14 and is piloted at its inner end in the hub portion 34 of the drive shaft 14 and at its other end is rotatably supported in a ball bearing assembly 35 supported in the speedometer housing section 8 of the transmission. The end plate member 29 of the planet arm or carrier means of the planetary gear mechanism P1 has suitable splined connection to the inner end of the driven shaft 32. A sun gear shaft 36 extends co-axially of and between the driven shaft 32 and the planet arm shaft 30 of the planetary gear mechanism P1 and is mounted for relative rotation between the latter shafts by means of a bushing 38 and a needle bearing assembly 39 disposed adjacent opposite ends of the sun gear shaft 36 and between the latter and the driven shaft 32, and by means of a bushing 40 disposed between the sun gear shaft 36 and the outer end of the planet arm shaft 30.

The second planetary gear mechanism P2 comprises a second ring gear member 42 having an end plate portion 43 having splined connection with the external splines formed at the outer end of the planet arm shaft 30 of the planetary gear mechanism P1. A plurality of second planet pinions 45 of the single planet type are adapted to have meshing engagement with the internal ring gear teeth of the ring gear member 42 and the external sun gear teeth of the member 20 extending between the planetary gear mechanisms $P_1$ and $P_2$ with the several planet pinions each being adapted to be rotatably mounted about a pin 47 secured at its opposite end in a planet carrier 48 journalled for rotation with respect of the planet carrier sleeve 30 of the planetary gear mechanism $P_1$ on a bushing 50 disposed therebetween and at its other end to a brake drum member 52 extending co-axially of the common axis of the drive and driven shafts and overlying the enlarged sleeve section 22 of the ring gear member of the first planetary gear mechanism $P_1$.

A clutch means C is arranged at the outer end of the sun gear shaft 36 which, as shown, is provided with an enlarged annular housing 55 to which a clutch disc housing section 56 is suitably secured as by a plurality of bolts or the like. The enlarged annular housing of the sun gear shaft 36 is formed with an annuular cylinder 58 into which an annular piston 59 is disposed for movement axially of the axis of the transmission.

As shown, the clutch means C further comprises a plurality of friction discs 60 of known form having connection with the outer splined end of the planet arm shaft 30, and a plurality of friction discs 61 also of known form are supported at their inner ends on a plurality of bolts each of which is supported at its opposite ends in the disc clutch housing section 56 and the enlarged annular housing 55 of the sun gear shaft 36. The piston 59 at its inner end is provided with a clutch actuating annular plate 65 for effecting engagement of the clutch disc plates 60 and 61 upon movement of the annular piston 59 to the left the purpose of which will be referred to in greater detail hereinafter. As shown the outer end of the housing section 7 is provided with an inwardly extending enlarged sleeve or hub portion 70 in which the outer reduced end 72 of the sun gear shaft 36 is journalled. The outer end portion 72 of the sun gear shaft is provided with an annular channel 73 into which fluid under pressure is adapted to be admitted through a duct or port 74 from a source of fluid under pressure (not shown). A port or duct 75 extends between the annular groove 73 and an annular passageway formed by an annular channel in the end portion 72 of the sun gear shaft and the enclosing bearing casing of the pin bearing means 39 and from which passageway a duct or port 78 extends to the cylinder 58. Fluid under pressure may be admitted into the passageway system just described by means of any suitable transmission control valve means for effecting movement of the piston 59 to the left as viewed in Figure 1 to clutch the planet carrier means of the planetary gear mechanism $P_1$ to the sun gear thereof together with the ring gear element 42 which it will be remembered has splined connection with the planet carrier shaft 30.

A conventional form of rotor pump 80 is disposed within a pump housing formed at the outer end of the transmission housing section 7 and an end housing plate member 81 which is adapted to be secured about its outer peripheral edge between the housing sections 7 and 8 of the transmission. This pump means is of known construction, and as shown is adapted to draw fluid collected in the sheet metal pan 83 secured at the bottom of the housing section 7 and to deliver the fluid through a conduit means 84 to the valve control means previously referred to for controlling admission of fluid under pressure into the duct 74. As previously related a known form of speedometer construction 86 is contained within the housing section 8 and comprises a worm 87 keyed to the driven shaft 32. The driven shaft at its outer end has a known form of propeller shaft connecting member 90 splined thereto and secured to the driven shaft by the nut 91 having threaded engagement with the threaded outer end of the driven shaft.

It will be observed that the annular housing 55 at the outer end of the sun gear shaft 36, and the clutch housing 56 together provide a brake drum means with which a brake means shown at 92 is associated and comprises a brake band member 94 carrying an annular band member 95 of friction material adapted to engage the brake drum to hold the same against rotation. The brake means 92 as best shown in Figure 6 further comprises an actuating cylinder 96 into which fluid is adapted to be admitted under pressure through suitable control means and in which the outward movement of a piston in the cylinder 96 effects rocking movement of a lever or bell crank 97 formed at its upper end with a cup-shaped portion 98 into which one end of a link 99 extends with the other end of the link being rotatably mounted upon a stud 100 fixed in a pair of supporting lugs 101 carried at one end of the brake band member 94. The opposite end of the brake band member 94 carries a lug member 102 engaging a stationary pin 102'. Thus outward movement of the piston in the cylinder means 96 through lever or bell crank 97 effects contracting of the brake band member 94 to engage the brake drum formed by the members 55 and 56 to hold the same against rotation.

A second brake means 103 is associated with the annular brake drum member 52 of the planet carrier means for the planet pinions of planetary gear mechanism $P_2$ and is of the same construction as the brake means 92 last described. Briefly, it will be observed that the brake means 103 comprises a brake band member 104 and an annular band of friction material 105 adapted to be contracted into engagement with the brake drum member 52 to hold the planet pinion means of the planetary gear mechanism $P_2$ against rotation upon outward movement of a piston contained within the cylinder 107. As before, a lever or bell crank 108 having connection with the piston disposed in cylinder 107 is provided with a cup-shaped portion 109 at its upper end. One end of a link 110 is disposed in the cup-shaped member 109 and at its other end is mounted upon the stud 111 supported in the pair of lugs 112 carried at one end of the brake band 104 with the other end of the brake band carrying a lug (not shown) identical to lug 102 which engages a stationary pin (not shown) identical to pin 102' whereby upon outward movement of the piston in the cylinder 107 the brake band is caused to be contracted to engage the friction member 105 thereof with the member 52 to hold the planet pinion means of the planetary gear mechanism $P_2$ against rotation.

Figure 2:
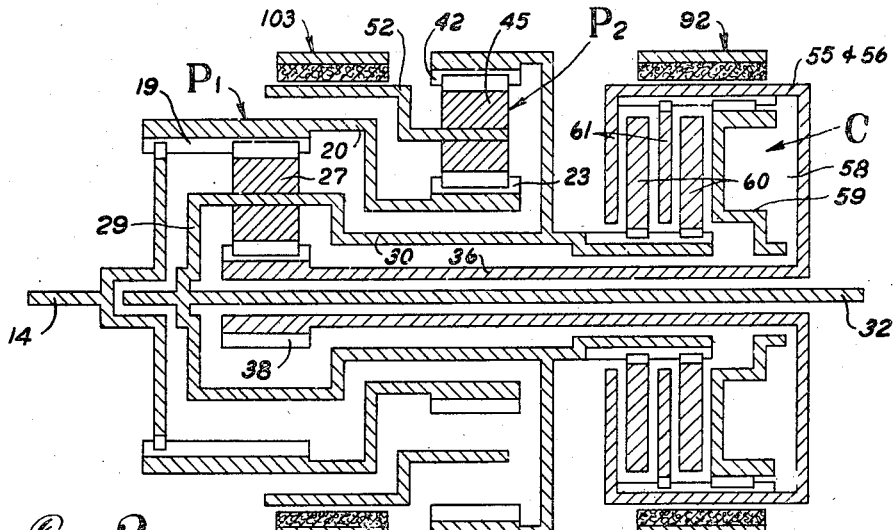
Figure 2 is a diagrammatic illustration of the essential parts and arrangement thereof of the transmission shown in Figure 1.

In Figure 2 I have shown diagrammatically the transmission described in detail in connection with Figure 1 and to which reference may be had in connection with the following description of the operation of this embodiment of my invention.

In Figure 2 the clutch means C and the pair of brake means 92 and 103 are disengaged and in which position the drive line between the drive shaft 14 and the driven shaft 32 is broken providing a neutral for the transmission. Now upon the actuation of the brake means 92 to hold the brake drum member comprising the members 55 and 56 against rotation it will be observed that the sun gear 38 of the planetary gear mechanism $P_1$ will be held against rotation. The drive through the transmission will then be from the drive shaft 14 to the ring gear 19 of the planetary gear mechanism $P_1$, through the planet pinions 27 and then through the planet carrier arm 29 to the driven shaft 32 and by virtue of the gear ratio provided by the planetary gear mechanism $P_1$ impart ratio drive to the driven shaft 32 with respect to the drive shaft 14 thus providing one forward drive ratio through the transmission. A second forward drive ratio is adapted to be effected by disengaging the brake means 92 and engaging the friction clutch means C as by admission of fluid under pressure to the cylinder 58 to urge the piston 59 to the left and which upon engagement of the friction discs 60 and 61 effects clutching of the planet pinion carrier means comprising the planet arm shaft 30 and the member 29 together with the sun gear 38 of a planetary gear mechanism $P_1$ to effect locking up of the two elements of the latter planetary gear system so that a direct drive is adapted to be transmitted from the drive shaft 14 through the planetary gear mechanism $P_1$ to the driven shaft 32. It will be observed that the ring gear 42 of the planetary gear mechanism $P_2$ is also caused by engagement of the clutch means C to be clutched for conjoint rotation with the sun gear 38 of the planetary gear mechanism $P_1$ but that since the brake means 103 is disengaged the planetary gear mechanism $P_2$ merely rotates as a fly wheel without effecting the delivery of any torque therethrough from the drive to the driven shafts.

Now in order to effect reverse drive from the drive shaft 14 to the driven shaft 32 the clutch means C and the brake means 92 are both disengaged and the brake means 103 actuated to hold the planet pinion carrier member 52 of the planetary gear mechanism $P_2$ against rotation. Under the condition last referred to it will be observed that drive from the drive shaft 14 to the sun gear 19 of the planetary gear mechanism $P_1$ effects rotation of the sun gear 23 of the planetary gear mechanism $P_2$ and since the planet carrier of the latter planetary gear mechanism is being held against rotation the ring gear 42 will be caused to rotate in a direction opposite the direction of rotation of the sun gear 23, and since the ring gear 42 has connection with the planet arm shaft of the planet carrier means of the planetary gear mechanism $P_1$ reverse drive is adapted to be effected to the driven shaft 32. The drive through the planetary gear mechanism $P_2$ under the conditions last described effects reverse ratio drive of the driven shaft 32 with respect to the drive shaft 14.

It will be observed from the above that the three means comprising the brake means 92, the brake means 103, or the clutch means C, are adapted to be actuated individually with respect to each other and in which the actuation of one of these three means provide for one of two forward drive ratios and reverse drive ratio between the drive and driven shafts of the transmission.

Figure 3:
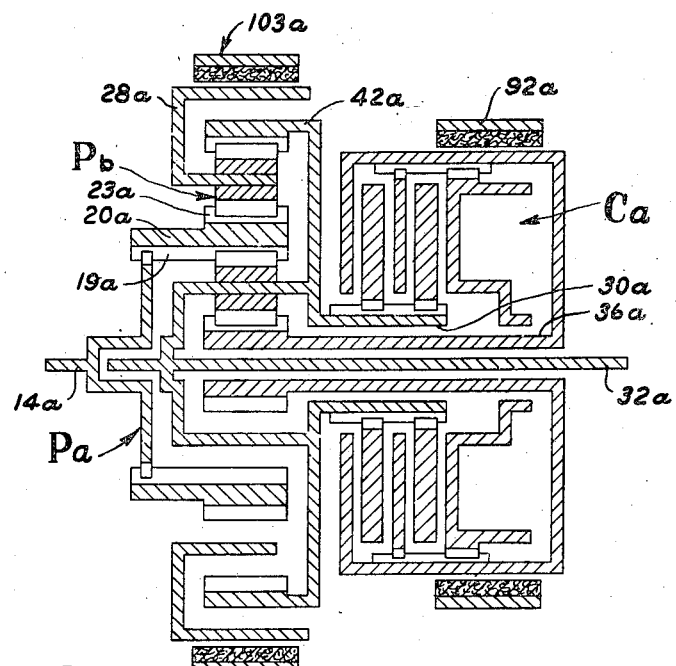
Figure 3 is a diagrammatic view of a transmission along the lines of the transmission of Figures 1 and 2 but illustrating an arrangement wherein the first and second planetary gear mechanisms are disposed concentrically of each other about the common axis of the drive and driven shafts of the transmission.

Referring now to Figure 3 I have diagrammatically shown a modified form of transmission which operates in the same manner as the transmission above described in connection with Figures 1 and 2, but in which a first planetary gear mechanism $P_a$ and a second planetary gear mechanism $P_b$ are arranged with the planetary gear mechanisms being disposed co-axially of and concentrically with each other. In this form of the invention the common connecting member 28a between the pair of planetary gear mechanisms comprises a substantially annular member having internal ring gear teeth 19a and external sun gear teeth 23a providing for the concentric disposal of the pair of planetary gear mechanisms with respect to each other. It will be observed that by forming the common member between the pair of planetary gear mechanisms $P_a$ and $P_b$ in the manner described that they may be disposed concentrically with respect to each other so that the sun gear shaft 36a and the planet arm shaft 30a may be of considerable less axial length providing a transmission of greater height but less axial length than the transmission of Figure 2. The relation of the clutch means $C_a$ the brake means 92a and the brake means 103a are in the same relation with respect to the several elements of the planetary gear mechanisms $P_a$ and $P_b$ as described in connection with Figures 1 and 2 and is believed need not be further described in detail for an understanding of the operation of the transmission of Figure 3. However, it will be observed that the planet carrier member 28a of the planetary gear mechanism $P_b$ is provided with a brake drum portion disposed co-axially of and in overlapping relation with respect to the ring gear 42a of the second planetary gear mechanism $P_b$.

As in the embodiment described in connection with Figures 1 and 2 actuation of the clutch means $C_a$ is effective to provide direct ratio drive in a forward direction from the drive shaft 14a to the driven shaft 32a. Upon disengagement of the clutch means $C_a$ and engagement of the brake means 92a low ratio drive in a forward direction between the drive shaft 14a and driven shaft 32a is provided. Upon disengagement of the clutch means $C_a$ and the brake means 92a and engagement of the brake means 103a reverse drive in ratio is provided for between the drive shaft 14a and the driven shaft 32a.

Referring now to Figure 4 I have shown still another form of transmission constructed in accordance with my invention comprising a first planetary gear mechanism $P_c$ and a second planetary gear mechanism $P_d$. The pair of planetary gear mechanisms are disposed in spaced relation lengthwise of the common axis of the drive shaft 14b and the driven shaft 32b with the clutch means $C_b$ disposed therebetween. In this form of the invention the clutch means $C_b$ is arranged between the ring gear 19b of the planetary gear mechanism $P_c$ and the sun gear 23b of the planetary gear mechanism $P_d$ and the planet pinion carrier of the planet pinions 27b of the planetary gear mechanism $P_c$. The brake means 103b is associated with the planet pinion carrier 52b of the planetary gear mechanism $P_d$ and the brake means 92b is associated with the sun gear 38b of the planetary gear mechanism $P_c$. In this form of transmission upon engagement of the brake 92b with the clutch means $C_b$ and the brake means 103b disengaged the sun gear 38b of the planetary gear mechanism $P_c$ is held against rotation so that low forward ratio drive is adapted to be imparted through the planetary gear mechanism $P_c$ from the drive shaft 14b to the driven shaft 32b through the planet pinions 27b. Upon release of the brake means 92b and engagement of the clutch means $C_b$ the planet carrier of the planetary gear mechanism $P_c$ is caused to be clutched to the ring gear 19b thereof to provide for direct drive in the forward direction between the drive shaft 14b and the driven shaft 32b. In order to effect reverse drive between the drive and driven shafts the brake means 103b is caused to be actuated with the clutch $C_b$ and the brake means 92b disengaged so that drive between the drive and driven shafts is caused to be imparted through the sun gear 23b of the planetary gear mechanism $P_d$ to effect rotation of the ring gear 42b thereof in a direction opposite the direction of rotation of the sun gear 23b and then through the planet carrier means of the first planetary gear mechanism $P_c$ to the driven shaft 32b.

In Figure 5 I have shown still another embodiment of my invention in which the transmission operates in the same manner as that of Figure 4 but differs in the arrangement of the planetary gear mechanisms with respect to each. In this form of the transmission a pair of planetary gear mechanisms $P_e$ and $P_f$ are arranged concentrically and co-axially of the common axis of the drive and driven shafts 14c and 32c, respectively. The pair of planetary gear mechanisms comprise the common member 20c therebetween and is of sleeve form similar somewhat to the corresponding element of the transmission of Figure 3, and is formed with internal ring gear teeth 19c for the first planetary gear mechanism $P_e$ and external sun gear teeth 23c for the planetary gear mechanism $P_f$. Likewise in this form of the invention the planet carrier member 28c is formed with a brake drum portion extending co-axial of and overlying the ring gear member 42c of the planetary gear mechanism $P_f$. As before a disc clutch means $C_c$ is arranged between the ring gear member 19c and the planet pinions 27c with the planet carrier arm of the planetary gear mechanism $P_e$ being connected with the ring gear member 42c of the planetary gear mechanism $P_f$. Low ratio drive is adapted to be effected between the drive and driven shaft in this form of the transmission by engagement of the brake means 92c to hold the sun gear 38c of the planetary gear mechanism $P_e$ against rotation with the brake means 103c and the clutch means $C_c$ being disengaged. In order to effect direct drive from the drive shaft 14c to the driven shaft 32c the clutch means $C_c$ is caused to be engaged to lock the ring gear member with the planet pinion means of the planetary gear mechanism $P_e$ with, of course, the brake means 92c and 103c being disengaged. In order to effect reverse drive from the drive shaft 14c to the driven shaft 32c the brake means 103c is caused to be actuated with the clutch means $C_c$ and the brake means 92c disengaged which is effective to hold the planet carrier of the planet pinion means of the planetary gear mechanism $P_f$ against rotation effecting rotation of the ring gear of the latter planetary gear mechanism in a direction opposite the direction of rotation of the common ring gear and sun gear element of the planetary gear mechanisms $P_e$ and $P_f$, respectively, and providing through the planet pinion carrier means of the planetary gear mechanism $P_e$ reverse ratio drive of the driven shaft 32c.

In conclusion it will be observed that the forms of transmissions illustrated diagrammatically in Figures 2 and 4 provide for the disposing of a pair of planetary gear mechanisms spaced lengthwise of a common axis of drive and driven shafts of a transmission, and which in the embodiment of Figure 2 the clutch means C is disposed adjacent one end of the transmission while in the embodiment of the invention shown in Figure 4 the clutch means $C_b$ is disposed between the pair of planetary gear mechanisms. Also, it will be observed that the transmissions of Figures 3 and 5 are of a character in which a pair of planetary gear mechanisms are disposed co-axially and concentrically of each other with the transmission of Figure 3 being similar to that of Figure 2 and with the transmission of Figure 5 being similar to that of Figure 4. The arrangement of the transmissions of Figures 3 and 5 may be resorted to in instances where axial length of the transmission is at a premium and wherein increased vertical height is not objectionable to provide transmissions having the same manner of operation as the transmissions of Figures 2 and 4 respectively. In the transmissions of Figures 2 and 3 the clutch means when actuated is effective for clutching the sun gear and planet pinion means of one of the planetary gear mechanisms together in effecting forward direct drive through the transmission whereas in the transmissions of Figures 4 and 5 the clutch means when actuated is effective for clutching the ring gear and planet pinion means of one of the planetary gear mechanisms together for conjoint rotation in effecting direct drive in the forward direction through the transmission. In the forms of the transmissions of Figures 3 and 5 the clutch means is located substantially intermediate the pair of brake means associated with each of the transmissions.

While I have shown what I consider to be the preferred embodiments of my invention it will be understood that various modifications and rearrangements may be made therein without departing from the spirit and scope of my invention.

I claim:

1. A transmission having co-axially extending drive and driven shafts comprising, a first planetary gear mechanism disposed co-axially of the axis of said drive and driven shafts having three elements, namely, a sun gear, planet pinion means, and a ring gear, a second planetary gear mechanism disposed co-axially of the axis of said drive and driven shafts and concentrically of said first planetary gear mechanism, having three elements, namely, a sun gear, planet pinion means and a ring gear, and said ring gear of said first planetary gear mechanism being formed integrally with said sun gear of said second planetary gear mechanism.

2. A transmission having co-axially extending drive and driven shafts comprising, a first planetary gear mechanism disposed co-axially of the axis of said shafts and having three elements, namely, a first sun gear, first planet pinion means and a first ring gear, said first sun gear having a brake drum member associated therewith and spaced lengthwise therefrom along said axis, a second planetary gear mechanism disposed co-axially of said axis and concentrically of said first planetary gear mechanism and having three elements, namely, a second sun gear, second planet pinion means, and a second ring gear, said first ring gear and said second sun gear being integral, said second planet means having a brake drum member associated therewith disposed co-axially of said axis and concentrically of said second ring gear, friction clutch means including the brake drum member of said first sun gear between the latter and said second ring gear disposed co-axially of said axis and adjacent said first and second planetary gear mechanisms, and brake band means associated with each of said brake drum members of said first sun gear and said second planet means.

3. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, and brake means associated with said first sun gear.

4. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, and brake means associated with said second planet pinion means.

5. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, first brake means associated with said first sun gear, and second brake means associated with said second planet pinion means.

6. A transmission comprising, drive and driven shafts, a first planetary gear mechanism having three first elements, namely, a first sun gear, first planet pinion means, and a first ring gear, a second planetary gear mechanism having three second elements, namely, a second sun gear, second planet pinion means, and a second ring gear, one of said first elements of said first planetary gear mechanism being connected with one of said second elements of said second planetary gear mechanism, said one of said first elements having connection with said drive shaft of the transmission, a second of said first elements having connection with said driven shaft of the transmission and a second of said second elements of said second planetary gear mechanism, first brake means associated with the third of said second elements of said planetary gear mechanism, second brake means associated with the third of said first elements of said first planetary gear mechanism, clutch means between said second of said first elements and the third of said first elements of said first planetary gear mechanism, said drive and driven shafts extending co-axially of each other with said first and second planetary gear mechanisms being disposed co-axially of the axis of said shafts, and said second planetary gear mechanism being disposed concentrically of the first planetary gear mechanism.

7. The transmission of claim 6 characterized by the arrangement of the clutch means between the first and second brake means.

WOODROW A. HASBANY.

REFERENCES CITED

The following references are of record in the file of this patent:

UNITED STATES PATENTS

| Number | Name | Date |
|---|---|---|
| 593,652 | Hardingham | Nov. 16, 1897 |

FOREIGN PATENTS

| Number | Country | Date |
|---|---|---|
| 318,210 | Great Britain | Aug. 30, 1929 |
| 367,079 | Great Britain | Feb. 18, 1932 |